Nov. 3, 1959  F. R. OLSON  2,911,237
COUPLING FOR RESILIENT TUBULAR MEMBERS
Filed Sept. 25, 1956  2 Sheets-Sheet 1

INVENTOR
Frank Russell Olson
BY Charles W. Hull
ATTORNEY

Nov. 3, 1959      F. R. OLSON      2,911,237
COUPLING FOR RESILIENT TUBULAR MEMBERS

Filed Sept. 25, 1956      2 Sheets-Sheet 2

INVENTOR
Frank Russell Olson
BY Charles W. Hull
ATTORNEY

United States Patent Office 2,911,237
Patented Nov. 3, 1959

2,911,237
COUPLING FOR RESILIENT TUBULAR MEMBERS

Frank Russell Olson, Carlisle, Pa., assignor to Carlisle Corporation, a corporation of Delaware Application September 25, 1956, Serial No. 611,951

7 Claims. (Cl. 285—260)

This invention relates to couplings for pipes in which both pipe members are flexible. More specifically, this invention relates to a coupling and method for forming the same for joining two flexible tubular members by means of a pair of rigid rings. This coupling and method are especially adaptable for use with flexible irrigation pipes although it is not limited to such use.

The increased demand for food has required cultivation of lands in regions which are normally arid and dry and which require water to be piped in from great distances. It has been found that a convenient way to so pipe water and to distribute it around the field is by means of a flexible tubing. Such flexible tubing may range from three to four inches to a foot and a half in diameter, and its flexible nature allows easy transportation and storage when not in use. The tubing may be simply rolled up into a tight little bundle.

To join lengths of flexible tubing together it is obviously necessary to have some sort of coupling. In the past, rigid couplings secured to the flexible tubing have been used. Such couplings have been in the form of rigid rings, one secured to each end and a bolted annular clamping member holding the two rings together.

Another form of pipe coupling for flexible pipe is suggested by Teed in Patent No. 1,296,251. In this coupling a rigid ring is sewed into the terminal hem of each member to be joined. One of these rigid rings is capable of being collapsed. To make the joint, the collapsible member is broken and placed within the other hose end. Thereupon it is reconstructed and aligned with the whole ring in the other end. This produces a tight joint because as pulling pressure is applied on the two hoses, the two rings are merely brought closer together.

The above couplings obviously have their disadvantages. In the clamp type of coupling, making the joint involves a complicated process, usually requiring the use of tools, and taking considerable time to perform. In addition, the clamp joint generally requires that the flexible member be secured to the ring member by modes which are not readily accomplished out in the field. Likewise, the second-described coupling requires attachment of the rings securely to the ends of the flexible members. Once this is accomplished, the process of reconstructing the broken ring within the outer flexible member is a difficult process, obviously time consuming and frustrating. The second-described coupling is also susceptible to the drawback that the collapsible ring may collapse accidentally causing the joint to fail.

My novel joint with its alternate structure and the method for making it is not susceptible to the drawbacks of prior devices. One of the objects of my invention is to produce a coupling for flexible members which is simple of construction, and which requires no tools, nor knowledge of any special kind to effect it.

Another object of my invention is to provide a coupling which is virtually foolproof in that a farm hand may produce it hurriedly and still have a tight coupling which will not fail.

Another object of my invention is to produce a coupling for flexible members which does not restrict the flow of fluid therethrough in any way.

An additional object of my invention is to provide a coupling for flexible members which may be applied in the field at a break in the flexible member without the use of tools and will thereby effect a tight non-leaking splice.

Briefly, my invention is a coupling for two non-rigid tubular ends in which one of said ends extends within the other to form the joint. As with any joint for flexible members, it is occasionally subjected to pulling forces in opposite directions. My joint is able to withstand these pulling forces without coming apart and actually benefits from them by becoming tighter under stress. In the simplest form of my invention, the mouth of said inner end is held open by a first ring peripherally associated therewith, said first ring being rigid. The outer end is stretched over this first ring. A second ring is made to surround the outer end on the opposite side of the first ring from any pulling force which acts on the outer end. The second ring is inextensible and is not of sufficient girth to pass over the first ring. Thus, as pulling forces act, the two rings are merely brought closer together to engage more tightly the flexible members therebetween.

This invention embodies other novel features, details of construction and arrangement of parts which are hereinafter set forth in the specification and claims, and illustrated in the accompanying drawing wherein:

Figure 1:
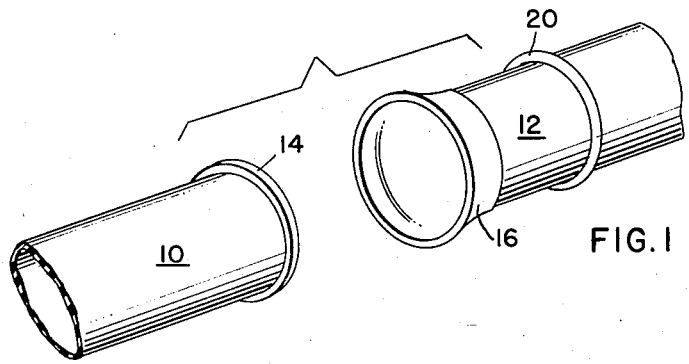
Fig. 1 is a perspective view of the two ends of the flexible members before the joining. It shows the second ring loosely surrounding the inner member.
Figure 2:
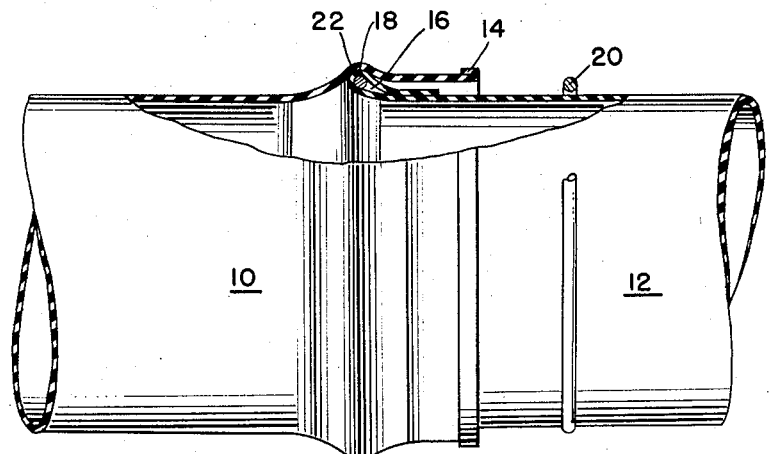
Fig. 2 is an enlarged view, partially in section, showing an intermediate step in the forming of the coupling.
Figure 3:
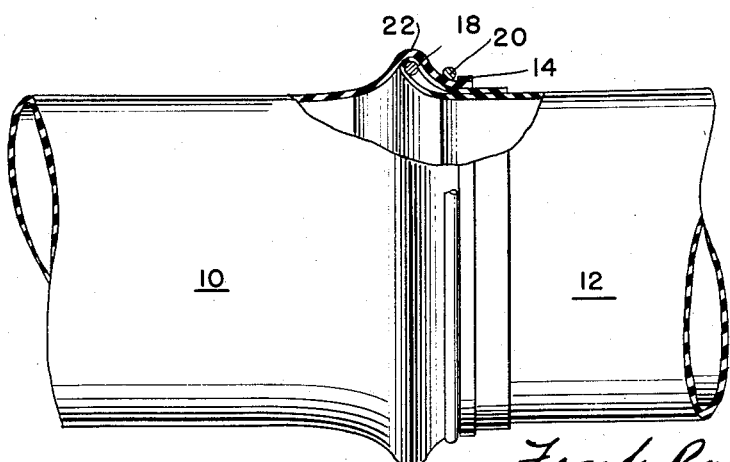
Fig. 3 is an enlarged view, partially in section, showing the completed coupling in its simplest construction.

Referring more specifically to the drawings, one form of my invention is shown in Figures 1 through 3. In this form the coupling is made in the end portions of two flexible tubular members 10 and 12. Both members may be of rubber or fabric suitably treated. The member 10, designated hereafter as the outer member, has vulcanized or glued to its periphery at its margin a ring 14 formed of similar material and forming an annular laterally extending flange. The member 12, designated hereafter as the inner member, has the marginal end portion thereof doubled back preferably on the outside of the member 12 forming a cuff 16. The margin can be fixed thus to the outside by a gluing or vulcanizing process. Within the cuff, the rigid circular ring member 18 is disposed. The ring is preferably of cold rolled steel but may be made of other suitable rigid materials, such as brass. A second ring 20, inextensible and preferably rigid and of somewhat lesser girth than the ring 18, loosely surrounds the inner member 12 at a distance from the margin thereof.

In the first step toward constructing the coupling (see Fig. 2) the outer member 10 is stretched over the rigid ring 18 contained in said cuff of the inner member 12. The ring 18 is peripherally aligned within the outer member 10 and produces a distorted enlarged area forming an annular bulge 22. Subsequently, the ring 20 is brought up over the ring 14 of the outer member and positioned adjacent the bulge 22. Thus, portions of both the inner and the outer end members 10 and 12 are disposed between the two rings (see Fig. 3).

As a result of this construction as the joint is subjected to the inevitable pulling force of use any relative motion between the inner and the outer end members will only tend to draw the two rings 18 and 20 closer together making the joint more tight. The ring 14 as it abuts ring 20 will serve as a stop, precluding the possibility of the margin of the member 10 slipping under the ring 20.

An alternate construction of my joint and method for making same is shown in Figs. 4 through 8. In this form of the invention the construction of a cuff on the inner member is not necessary. Nor is it necessary to secure a ring 14 to the outer member. Thus, this alternate construction is especially adaptable for construction in the field as for instance when it is necessary to splice a flexible member after cutting out a ruptured section thereof. The only material necessary for effecting this alternate form of construction is the two metal rings.

Figure 4:
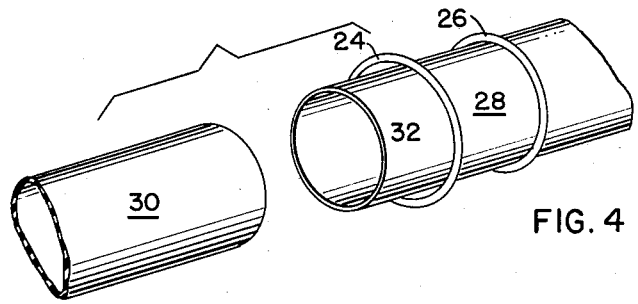
Fig. 4 is a perspective view showing the ends of two flexible members before proceeding with the alternate construction.
Figure 5:
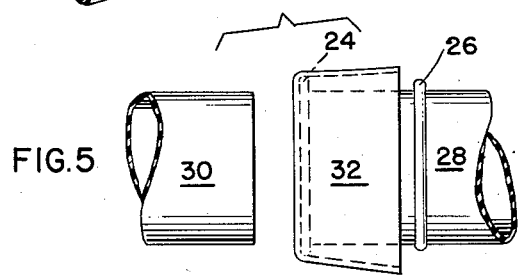
Fig. 5 shows the first step in the forming of the alternate construction.

The elements required for the alternate construction are shown in Fig. 4 with the two loose rings 24 and 26, the latter being lesser in girth, surrounding the inner member 28. Adjacent is the outer member 30. The first step in forming the alternate construction is to double back the marginal portion 32 of the inner end member over the ring 24 (see Fig. 5). Next the outer end 30 is stretched over the inner end including the portion which overlies the ring 24. This produces a distorted area forming an annular bulge 34 in the outer end. Subsequently, see Fig. 7, the lesser ring 26 is moved up over the outer end to a position adjacent the bulge 34. Thus, between the two rings 24 and 26 are positioned portions of the inner and outer members 30 and 28. Finally, the portion of the outer member between the ring 26 and the margin, said portion being designated 36, is turned back over the ring 26, concealing it. This latter doubling back (see Fig. 8) creates a means to ensure the integrity of the joint in two ways. First, the doubled back portion 36 guards the ring 26 so that it will not be accidentally knocked away from the ring 24. In addition, when it is doubled back, more of the outer member 30 contacts the ring 26 so that the frictional engagement between the two is better, lessening any chance that the outer member 30 will slip under the ring 26.

As before, with this alternate construction, forces tending to pull the inner and outer members in opposite directions away from the joint will only tend to tighten the joint. Such forces will bring the two rings 24 and 26 closer together, squeezing the flexible members therebetween forming seals therebetween.

Figure 10:
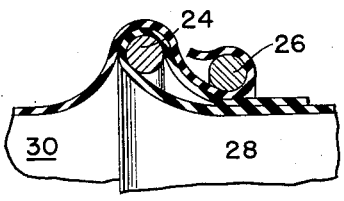
Figure 7:
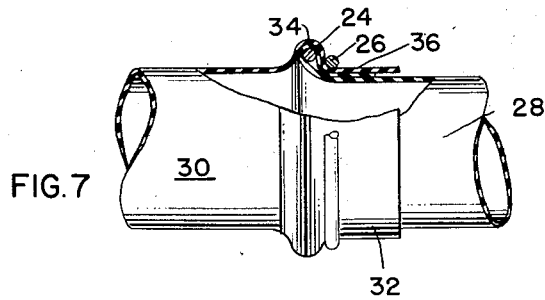

Fig. 10 is an enlarged view showing the relation between the two rings 24 and 26 and the laps of the flexible members 28 and 30 in this alternate construction.

Figure 9:
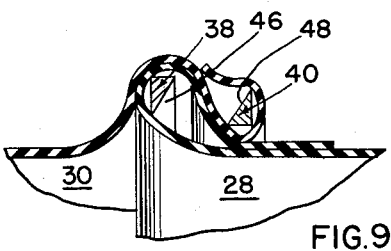
Figs. 9 through 11 are enlarged sectional views showing alternate constructions of the ring members comprising my joint.
Figure 6:
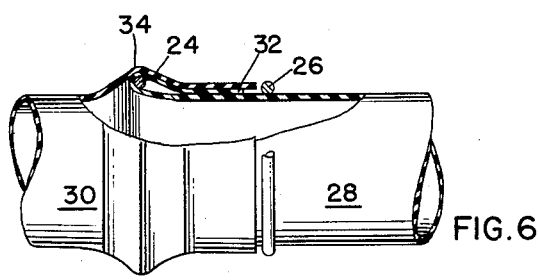
Figs. 6 through 8 show views partially in section of additional progressive steps in the formation of the alternate construction.
Figure 11:
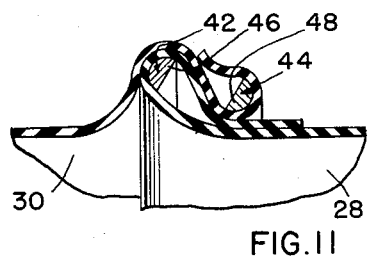
Figure 8:
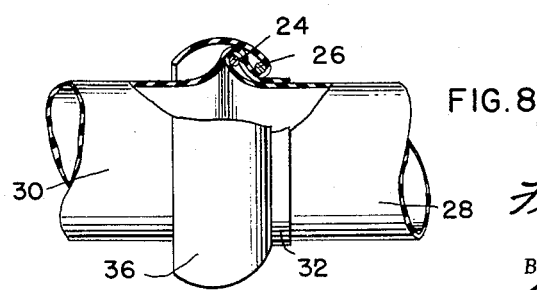

Figs. 9 and 11 show alternate forms of the rings in which the cross section of each ring is of distinctive shape to aid in gripping the material between the rings. In Fig. 9 the rings 38 and 40 have triangular cross sections. In Fig. 11 the cross sections of the rings 42 and 44 are semi-circular. In each case, a flat portion 46 of the one ring cooperates with the flat annular portion 48 of the other ring to squeeze the flexible material therebetween when pulling forces are exerted on the tube members. It is believed that this arrangement results in better gripping action of the flexible material.

Thus, I have invented a novel coupling for two flexible end members. My coupling is extremely simple and inexpensive to construct, yet it is rugged and dependable. While this invention has been shown in but two forms, it is obvious to those skilled in the art that it is not so limited but is susceptible of various changes and modifications without departing from the spirit and scope of the claimed invention.

I claim as my invention:

1. A coupling between a pair of aligned resilient flexible tubular members comprising a pair of rigid rings each having an inner diameter larger than the diameter of said tubular members, an end portion of one of said tubular members being stretched through and over one of said rings and forming a skirt portion extending reversely over and in engagement with the outer surface of a portion of said one of said tubular members, an end portion of the other of said tubular members being stretched over the said end portion of the said one tubular member and resiliently engaging the outer surfaces of at least a portion of said skirt portion, the other of said rigid rings surrounding and engaging the other of said tubular members radially outwardly of said skirt portion, the annular portion of the said other ring which lies closest to the plane of the said one ring having a lesser diameter than the similar opposed portion of said one ring, and means resisting axial movement of said other ring on the end portion of said other tubular member, the engagement of the parts of said coupling instituting the sole means resisting axial separation of said tubular members.

2. A coupling between a pair of aligned resilient flexible tubular members as claimed in claim 1, wherein said means consist of an annular flange on the periphery of said other tubular member end portion.

3. A coupling between a pair of aligned resilient flexible tubular members as claimed in claim 1, wherein said means consist of said end portion of said other tubular member being folded backwardly over at least said other ring.

4. A coupling between a pair of aligned resilient flexible tubular members as claimed in claim 1, wherein said means consist of said end portion of said other tubular member being folded backwardly over both said rings.

5. A coupling for a pair of flexible tubular members as claimed in claim 1, wherein said first and second rings have complementary cross sections with respect to each other, each cross section having a straight line adjacent a straight line in the other.

6. A coupling for a pair of flexible tubular members as claimed in claim 1, wherein said rings are each of a triangular cross-sectional configuration and are positioned with sides thereof opposite one another.

7. A coupling for a pair of flexible tubular members as claimed in claim 1, wherein said rings are each of a semi-circular cross-sectional configuration and are positioned with sides thereof opposite one another.

References Cited in the file of this patent

UNITED STATES PATENTS

| | | |
|---|---|---|
| 367,790 | Darrah | Aug. 9, 1887 |
| 1,525,538 | Evans | Feb. 10, 1925 |
| 2,003,732 | Bins | June 4, 1935 |
| 2,129,105 | Spence | Sept. 6, 1938 |
| 2,356,333 | Matter | Aug. 22, 1944 |
| 2,567,773 | Krupp | Sept. 11, 1951 |
| 2,759,692 | Bohl et al. | Aug. 21, 1956 |

FOREIGN PATENTS

| | | |
|---|---|---|
| 108,527 | Great Britain | Aug. 9, 1917 |
| 606,814 | France | Mar. 15, 1926 |
| 774,439 | France | Sept. 17, 1934 |
| 511,751 | Great Britain | Aug. 23, 1939 |